Jan. 13, 1959 W. MILLER 2,868,988

METHOD OF REDUCING TRANSIENT REVERSE CURRENT

Filed Dec. 22, 1955

INVENTOR
WILLIAM MILLER

BY W R Maltby
Richard E Reed
ATTORNEYS

United States Patent Office 2,868,988

Patented Jan. 13, 1959

2,868,988

METHOD OF REDUCING TRANSIENT REVERSE CURRENT

William Miller, Alexandria, Va., assignor to the United States of America as represented by the Secretary of the Navy Application December 22, 1955, Serial No. 554,903

2 Claims. (Cl. 250—49.5)

(Granted under Title 35, U. S. Code (1952), sec. 266)

The invention described herein may be manufactured and used by or for the Government of the United States of America for governmental purposes without the payment of any royalties thereon or therefor.

The present invention relates to semi-conductors and more particularly to a method of reducing the duration of reverse transient currents due to diffusion of injected minority carriers.

When a diode is conducting in the forward direction, there exists a greater than equilibrium density of charge carriers in the diode. (The meaning of diode throughout the specification and claims is to be construed as meaning any semi-conductor type unidirectional element.) If the voltage on the diode is suddenly switched from the conducting to the non-conducting direction this stored charge manifests itself by producing a sharp "spike" reverse transient current similar to the sudden discharge of a condenser.

This reverse transient current is due to diffusion of injected minority carriers and the duration of the current is related to the lifetime of these carriers. The lifetime of the minority carriers, $\tau$, can be inferred from the time dependence of the reverse transient current. It has been determined that bombardment of the diode with high energy radiation for a limited amount of time will reduce the duration of the reverse transient currents without destroying the non-linearity of the static current-voltage characteristic. By determining $\tau$ after successive bombardment intervals, it has been determined that $$\frac{1}{\tau}$$

is a linear function of bombardment time (for fixed bombardment current). The reverse transient current is also a function of applied voltage and forward bias. When operated at high frequencies, the size and duration of this "spike" can be large enough to nullify essentially the "unidirectional" conducting characteristics of the diode.

It is therefore an object of this invention to reduce the duration and amplitude of reverse currents.

Another object of the present invention is to improve frequency characteristics of a diode.

Still another object of the present invention is to increase the maximum useable frequency of a diode as a rectifier or a mixer.

Yet another object of the present invention is to increase the maximum useable switching rate of a diode.

Still another object of the present invention is to reduce the duration and amplitude of reverse currents thereby increasing the maximum frequency of operation of a diode.

Other and more specific objects of this invention will become apparent upon a careful consideration of the following detailed description when taken together with the accompanying drawings, in which.

Figure 1:
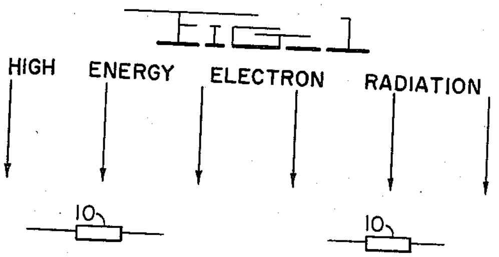
Fig. 1 is a view illustrating a diode exposed to bombardment of high energy radiation.
Figure 1A:
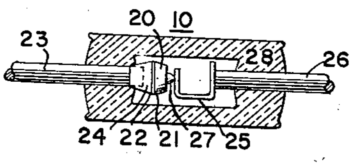
Fig. 1*a* is a cross sectional view illustrating the main parts of a typical silicon junction diode.

In the illustrated drawing of Fig. 1a there is shown a typical silicon junction diode 10 comprising a single crystal P-type silicon wafer 20 to which an aluminum layer 21 has been evaporated on the back surface and fused in at a high temperature. A layer of gold 22 is evaporated onto the aluminum layer to attach the crystal to a lead 23 by a vitreous metallic bonding material 24. A platinum spring contact 25 has been spotwelded to the opposite lead 26 and rigidly connected to a gold antimony button 27 which has been secured to the end of the crystal by fusing it into the crystal. During the cooling process after fusing the gold antimony button to the crystal the silicon is doped with antimony making it N-type thereby forming a P–N silicon junction diode. The above parts are hermetically-sealed in a glass to metal package 28 so that the parts are free from detrimental effects of moisture, etc. and the outer surface is coated with an opaque silicon enamel to shield the crystal from light.

In the illustrated drawing of Fig. 1 there is shown a semi-conductor diode 10 exposed to a high energy electron beam such as from a Van de Graff generator. The energy of the bombarding radiation depends on the structure of the diode since the radiation must have sufficient energy to pass completely through the diode. With sufficient exposure the duration of reverse transient currents is reduced by creating lattice displacements within the semi-conducting materials. The reduction of the reverse transient current depends on the energy and the length of time that the diode is bombarded.

The amount of exposure for a given semi-conductor diode type and a given energy level is readily determined by test exposure periods followed by measurement of this reverse transient current. If the first exposure period does not produce sufficient reduction the diode may be subjected to further exposure. It is not necessary that all exposures be made in one continuous period, however overexposure can permanently damage the diode.

For a typical semi-conductor diode such as a silicon junction diode (for example a Hughes type 6002 as disclosed in "Hughes, silicon junction diodes," Hughes Aircraft Company, Culver City, California, SP4–TM–GP–4/55, copyright 1955, and shown in Fig. 1*a*), the duration of reverse transient currents are reduced by a factor of 20 by bombarding the diode with 2 m. e. v. electrons for approximately 75 seconds with a current of $0.5\mu$ a./cm.$^2$. The static current-voltage curve shows some deterioration at large forward currents; i. e., in excess of 10 ma. indicating a decrease in bulk conductivity. In the illustrated example (Hughes type 6002) the current at 1.1 volts forward bias which was 35 ma. before bombardment was about 10 ma. after 75 seconds of bombardment with 2 m. e. v. electrons at $0.5\mu$ a./cm.$^2$ bombarding current. The current at —10 volts bias was less than $4\times10^{-10}$ amps. before and after the bombardment.

The semi-conductor diodes bombarded in accordance with this invention increases the upper frequency limit for which the diode can be used by shortening the lifetime of the carriers and may be incorporated in high speed switching and detection circuits. Also, bombardment of said diodes with high energy radiation such as electrons improves the frequency characteristics by increasing the maximum useable frequency as a rectifier or as a mixer.

Figure 2:
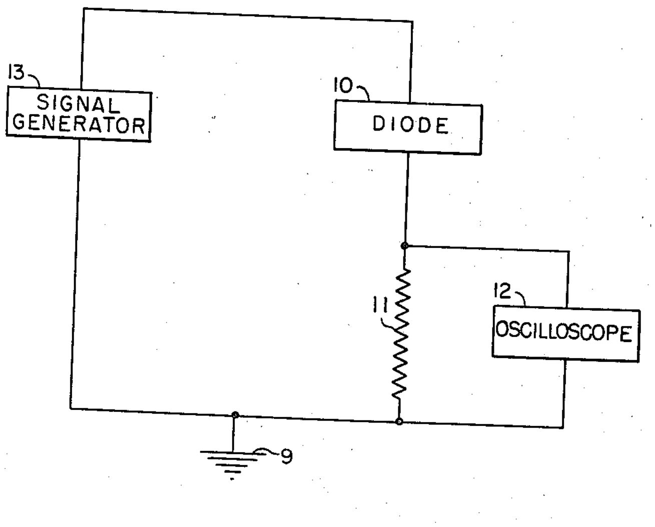
Fig. 2 is a schematic drawing partly in block form illustrating a circuit used in testing the transient characteristics of a diode to assure proper bombardment.
Figure 3:
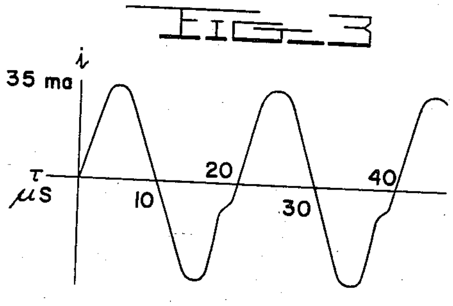
Fig. 3 is the waveform obtained by the circuit of Fig. 2 before bombardment of the diode.

Fig. 2 illustrates a schematic drawing of an electrical circuit which is used to test the diode for proper electron bombardment. The circuit is grounded at 9, and includes a diode 10 connected in series with a 100 ohm resistor 11 across which an oscilloscope 12 is connected. A signal generator 13 is connected in the circuit to generate a sine wave which causes a trace of the diode current to appear on the scope. In the illustrated scope traces, the oscillator frequency was 5 mc./sec. and Fig. 3 illustrates the current vs. time trace on the scope obtained for a diode before the diode was bombarded. The portion of the curve under the line indicates the large reverse currents created by the diode. This curve of the large reverse current indicates that the resistance of the diode in the back direction remained comparable to that in the forward direction for at least one quarter of a cycle (i. e., about $\frac{1}{20}$ of a microsecond). This low resistance in the back direction is due to the presence of stored minority carriers and the duration of the reverse current is related to lifetime of these carriers.

Figure 4:
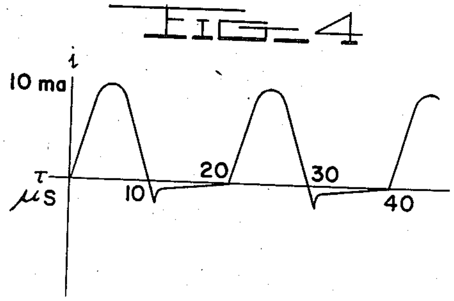
Fig. 4 is the waveform obtained with the same diode as used for the trace of Fig. 3 after bombardment.

Fig. 4 shows the current vs. time scope trace of the same diode as used in Fig. 3 after bombardment with electrons. The minority carrier lifetime was reduced so that the effect of stored minority carriers in reducing back resistance is negligible as indicated by the scope trace.

After bombardment the diode is connected in the circuit and the scope trace is noted to determine the reverse current curve, if there is a large reverse current shown the diode can be bombarded again for a limited period without harmful effects on the function of the diode.

This invention is not limited to any particular amount of bombarding radiation nor is it limited to a specific time of bombardment or current since it is obvious that for different diodes the time and current would be varied to get the best operating results.

From the foregoing disclosure it is obvious that commercially made semi-conductors now on the market may be subjected to high energy radiation singly or in mass production by placing the semi-conductors onto a conveyor and passing them under the high energy radiation.

Obviously many modifications and variations of the present invention are possible in the light of the above teaching. It is therefore to be understood, that within the scope of the appended claims, the invention may be practiced otherwise than as specifically described.

What is claimed is:

1. The method of reducing transient reverse currents of a semi-conductor diode which comprises bombarding said semi-conductor diode with 2 m. e. v. electrons that pass completely through the diode for a period of approximately 75 seconds with a current of 0.5 $\mu$a./cm.$^2$.

2. The method of reducing transient reverse currents of a semiconductor diode which comprises bombarding said diode with radiation of high energy electrons of about 2 m. e. v. with a current of about 0.5 $\mu$a./cm.$^2$, said radiation passing completely through said diode.

References Cited in the file of this patent

UNITED STATES PATENTS

| | | |
|---|---|---|
| 2,600,373 | Moore | June 10, 1952 |
| 2,709,232 | Thedieck | May 24, 1955 |
| 2,750,541 | Ohl | June 21, 1956 |
| 2,776,367 | Lehovec | Jan. 1, 1957 |

OTHER REFERENCES

Physical Review, 92 (1953), pp. 591–596; 86 (1952), p. 643.

Annular Review of Nuclear Science, vol. 2 (1953), pp. 204–210.

Lark-Horowitz: Abstract 64,034 of abandoned application, filed Dec. 7, 1948, published June 10, 1952 (found in vol. 659, page 590, O. G. 6/10/52).

A. E. C. D. 2054, by R. E. Davis et al., declassified June 3, 1948, pages 1–6.